United States Patent Office 2,706,450
Patented Apr. 19, 1955

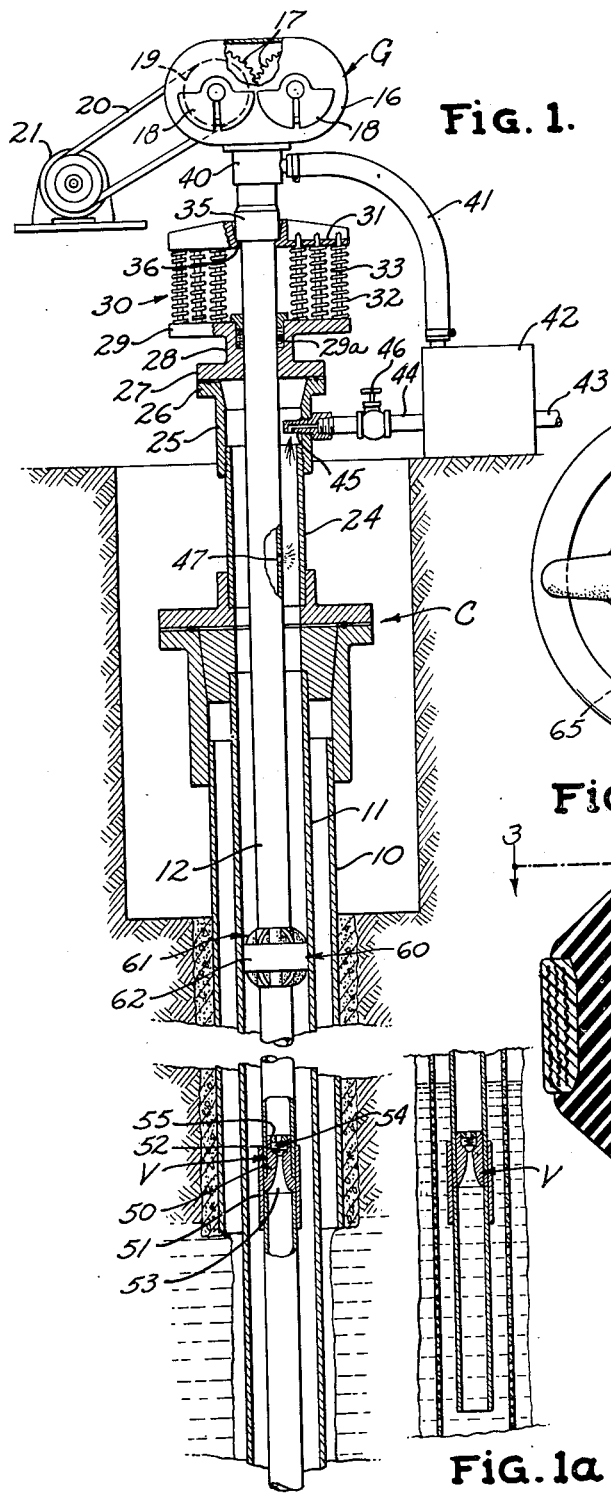

2,706,450

TUBING INSULATOR AND BEARING FOR SONIC PUMPS

Albert G. Bodine, Jr., Van Nuys, Calif.

Application February 19, 1951, Serial No. 211,608

6 Claims. (Cl. 103—1)

This invention relates generally to deep well sonic pumps, of the type disclosed in my United States Patent No. 2,444,912, and more particularly to vibration insulation and bearing devices for the pump tubing employed in such sonic pumps.

In my said prior patent, I disclosed a type of deep well pump operated by periodic deformation waves of tension and compression generated by means of a sonic vibration generator at the ground surface and transmitted in a longitudinal direction through the steel pump tubing to pumping valves mounted in the pump tubing. The periodic deformation waves are generated at sufficient frequency to provide longitudinal waves in the tubing having a quarter wave length which is no longer than substantially the length of the tubing. Usually, for deep wells, the tubing length is many times the quarter wave length of the wave generated in the tubing. In this action, the pump tubing is not bodily reciprocated, but waves of elastic longitudinal deformation travel along the tubing, causing local regions of the tubing to be set into vertical oscillation. The frequency at which these waves are generated may be, for example, 20 cycles per second, and they are generated with sufficient intensity to give a maximum deformation stroke in the tubing of the order of say ½". For present purposes it is only necessary to understand that the pump tubing is thus set into vertical oscillation at such frequency and with a deformation stroke of the order indicated. For a complete description of the operation of such a sonic pumping system, reference is directed to my aforesaid patent.

In the operation of such sonic pumps, the pump tubing requires some means for centering or guiding it inside the surrounding production casing, and certain difficult problems are encountered in providing suitable bearing arrangements for the pump tubing and for insulating the pump tubing from the casing, to prevent substantial loss of vibration energy from the tubing to the casing. The major object of the present invention is accordingly the provision of vibration insulation and bearing means for supporting the tubing inside the casing, designed to operate without undue wear, and also to accomplish effective insulation of the vibrating tubing from the casing.

In accordance with the invention, the pump tubing is provided with bearing and vibration insulation by, first, equipping the tubing with certain bearing and insulation devices adapted to engage the surfaces of the casing, and second, discharging a liquid stream into the annular space between the tubing and the production casing for lubrication of the bearing surfaces. This descending stream of liquid, which might be supplied from the output of the well, or from another source, provides an effective lubrication for the bearings, the vibrating pipe string tending to agitate the descending liquid, and establishing a condition of splash lubrication with good distribution over the surfaces requiring the lubrication. The preferred form of bearing and vibration insulator comprises a fiber filled phenolic resin annulus placed over a rubber spider which is in turn mounted on the tubing, the annulus being shaped and dimensioned to bear on the interior surface of the casing. The fibers in the phenolic resin absorb liquid from the discharged liquid stream and improve lubrication by maintaining a good liquid film on the exterior surfaces of the annulus.

The invention will be better understood from the following detailed description of a present illustrative embodiment thereof, reference being made to the accompanying drawings, in which:

Figure 1 is a longitudinal sectional view, with portions broken away, of a sonic pump equipped with the improvements of the present invention;

Figure 1a shows the lower end portion of the pump of Figure 1;

Figure 2 is a longitudinal sectional view of a bearing of the present invention shown mounted on a section of pump tubing; and Figure 3 is a view taken in accordance with line 3—3 of Figure 2.

In Figure 1 an oil well pumping installation is shown, the well bore being shown to be lined part way down by surface casing 10, while annularly spaced inside casing 10 is production casing 11, inside of which has been suspended the steel pump tubing 12. Mounted at the top of casings 10 and 11 is a suitable casing head, conventionally indicated at C, and the pump tubing 12 extends upwardly through said casing and has mounted at its upper end a vibration generator G. This generator G comprises a housing 16 containing a device for vibrating the upper end of the tubing 12 in a direction longitudinal of the latter, thereby exerting a vertical oscillating force upon the upper end of the tubing.

The means for generating the vibratory action is here shown of a simple type embodying meshing oppositely rotating spur gears 17 carrying eccentric weights 18, which balance out horizontal vibrations but are additive to produce a substantial resultant oscillatory force in a vertical direction. The generator has a driving pulley 19 driven through belt 20 from electric drive motor 21. Since this vibrator is employed to generate elastic waves in the pump tubing which are of the same nature as sound waves, and travel with the speed of sound waves in the pipe, I may properly refer to this vibrator as a sonic wave generator.

Extending upwardly from casing head C, at an annular spacing outside tubing string 12, is a pipe section 24, and screwed onto the upper end of the latter is a head 25 having at the top a flange 26. Bolted to flange 26 is a flange 27 of a tubular fitting 28 on the bottom of the lower platform 29 of a spring support device 30 for the tubing string and vibration generator G, the tubing being packed by a stuffing box at 29a. The spring supporting device 30 includes an upper plate or platform 31, supported from lower platform 29 by a plurality of coil springs 32, vertical guide rods 33 being used inside these coil springs, as indicated. The guide rods 33 may be set rigidly in the member 29, and project through suitable openings in the member 31 with a free sliding fit. A collar 35 near the upper end of the tubing string overhangs an upwardly facing seating shoulder 36 formed in the member 31, and it will be understood that the weight of the tubing string and vibrator G are transferred to the member 31, and, through springs 32, to the platform 29. This member 29 is, of course, supported from the casing head.

A delivery fitting 40 at the top end of the pump tubing, between the tubing and the generator G, delivers production fluid to hose 41, which leads to said trap 42, of any conventional or suitable nature, and the latter has main delivery pipe 43, and also auxiliary delivery pipe 44 leading to fluid injector nozzle 45 mounted in head 25 and discharging to the annular space between the tubing string and the production casing. Pipe 44 is controlled by a valve 56 to regulate the amount of production fluid so injected. As an alternative, the tubing string may be provided with one or more bleeder openings 47 of such size as to bleed a small fraction of the production fluid into the space between the tubing and the production casing. This simple expedient may be satisfactory in some cases, particularly in absence of sand in the production fluid.

As disclosed in my aforementioned patent on sonic pumps, the pump tubing contains one or more check valves such as indicated at V, and such valves may comprise a tubular fluid displacing member 50 mounted in the tubing string, preferably at the location of a coupling collar 51, and a check valve element 52 seating at the top end of the fluid passage 53 through the member 50. Preferably, the valve element 52 is urged toward its seat by a biasing spring 54, which may seat at its upper end against a support 55.

The operation of such a pump is fully set forth in my aforementioned patent. Briefly, the operation is as follows: It will be recalled that periodic deformation waves of tension and compression travel down the pump tubing as a result of the vertical alternating force applied to the upper end thereof by the generator device G. These waves set local portions of the tubing into vertical oscillation through an amplitude up to say ½". The tubular valve members 50 carried by the tubing accordingly have this vertical oscillation. On each down stroke, the member 50 travels with an acceleration sufficiently great to separate from the valve element 52; and fluid displaced by the member 50 travels upwardly therethrough and past the then unseated valve element 52. On the upstroke, the valve element 52 seats, and the column of well fluid thereabove is elevated. The column of well fluid above valve element 52 does not substantially drop during the downstroke of the member 52, because the acceleration of the latter considerably exceeds the acceleration of gravity.

The bearing and insulation devices of the invention are designated generally at 60. Each of these devices typically comprises a resilient sleeve, preferably and here shown in the form of a rubber spider 61, run on over the tubing, and a bearing annulus 62 mounted thereover. The bearing annulus may be of any one of a number of suitable materials, such as rubber, wood, plastic, but I have a preference for a phenolic resin filled with a fibrous material, preferably cotton canvas, because of its fluid-absorbing property.

The rubber spider 61 has a hub 63 adapted to slide easily on over the tubing, and radial arms or webs 64, peripherally notched at 65 to receive the bearing annulus. The bearing annulus is in the nature of a cylindrical ring, tightly received in the notch 65, and projecting radially from the spider so as to bear on the interior surface of the casing. The annulus 62 is compression-fitted over the spider 61 after the spider has been run onto the tubing 12. That is to say, the spider is first run into position, the annulus 62 run onto the tubing adjacent the spider, and the spider is then compressed sufficiently to permit the annulus to be press fitted on over the spider. The compressed spider accordingly tightly grips the tubing, and no further securing provisions need be provided. The spider permits gas passage in the case of oil wells.

The rubber spider, whose hub of course vibrates with the pump tubing, insulates against transmission of vibratory energy from the tubing to the casing, though of course some degree of vibratory motion is transmitted, and the bearing annulus accordingly oscillates in contact with the inner surface of the casing.

The liquid introduced, as already described, to the annular space between the casing and the tubing functions to wet and lubricate the bearing annulus 62, and under these circumstances, friction and wear between the bearing annulus and the casing are minimized, and long bearing life is accomplished. The vibrating tubing with its short stroke sinusoidal vibration agitates the descending liquid introduced into the annular bearing space, and sets up an unusually effective condition of concentrated splash lubrication, with good distribution over the surfaces required to be lubricated. The preferred bearing annulus material, i. e., cotton filled phenolic resin, tends to absorb and hold the lubricating liquid, and improves lubrication by maintaining a good liquid film over the bearing annulus.

It will be recognized that the resiliency of the mounting sleeve or spider 61 is for vibration insulation, and to aid in gripping the device to the tubing. This is an important feature of the preferred form of the invention.

The bearing function of the device is however served merely by the mounting, in any suitable fashion, of the bearing annulus on the tubing, together with the supply of lubricating liquid. It can be understood, of course, that a bearing well lubricated by a vibratory splash as described, whether it be a bushing, roller or any other known form of suitable bearing, will insulate to a large degree the longitudinal component of vibration.

One illustrative embodiment of the invention has now been shown and described. It will be understood, however, that this is for illustrative purposes only, and that various changes in design, structure and arrangement may be made without departing from the spirit and scope of the invention as defined by the appended claims.

I claim:

1. For use in a sonic pump having a vertically vibratory pump tubing annularly spaced inside a production casing, a tubing bearing and vibration insulator comprising a resilient spider adapted for mounting on the outside of said tubing, a relatively hard bearing annulus mounted on said spider having a peripheral bearing surface engageable with the inner surface of said casing, means for introducing liquid to the annular space between the casing and pump tubing to lubricate the peripheral surfaces of said bearing annulus.

2. In combination in a deep well having a casing and a sonic pump therein: a sonic pump tubing annularly spaced inside said casing, said tubing being elastically vibratory in its longitudinal direction by passage of periodic elastic deformation waves therealong, the annular space between said casing and tubing being gas filled for the major portion of its length, a bearing member surrounding and mounted on an intermediate portion of said tubing within the gas filled region of said annular space, said bearing member having bearing faces engaging the inner surfaces of said casing, and means for dripping a lubricating liquid into said gas filled space from above said member to splash-lubricate the engaging surfaces of said member and casing.

3. The subject matter of claim 2, wherein said bearing member includes a resilient vibration absorbing body for vibration-insulating the casing from the pump tubing.

4. The subject matter of claim 2, wherein the liquid introducing means comprises a production liquid bleeder opening in the pump tubing above the bearing member.

5. The subject matter of claim 2, wherein the liquid introducing means comprises a means for injecting into said annular space a small fraction of the well liquid produced through the pump tubing.

6. For use in a sonic pump having a vertically vibrating pump tubing annularly spaced inside a production casing, a tubing bearing mounted on the outside of said tubing engageable with the inner surface of said casing, said bearing member comprising a resilient body mounted on the tubing, and a bearing annulus mounted on said resilient body and provided with peripheral casing-engaging bearing surfaces, and means for introducing a lubricating liquid to the annular space between said tubing and casing to lubricate the bearing surfaces of said bearing.

References Cited in the file of this patent

UNITED STATES PATENTS

| Number | Name | Date |
|---|---|---|
| 1,475,038 | Tunnell | Nov. 20, 1923 |
| 1,515,816 | Smith | Nov. 18, 1924 |
| 1,614,865 | Boden | Jan. 18, 1927 |
| 2,153,787 | Anderson | Apr. 11, 1939 |
| 2,163,932 | Bettis | June 27, 1939 |
| 2,213,807 | Starbuck | Sept. 3, 1940 |
| 2,244,256 | Looman | June 3, 1941 |
| 2,394,189 | Kaufman | Feb. 5, 1946 |
| 2,444,912 | Bodine | July 13, 1948 |
| 2,460,361 | Petho | Feb. 1, 1949 |